Oct. 29, 1968  A. N. WRIGHT ET AL  3,408,172
DIAMOND AND CUBIC BORON NITRIDE GRAINS COATED WITH
PHOTOPOLYMERIZED MATERIAL
Filed March 1, 1966
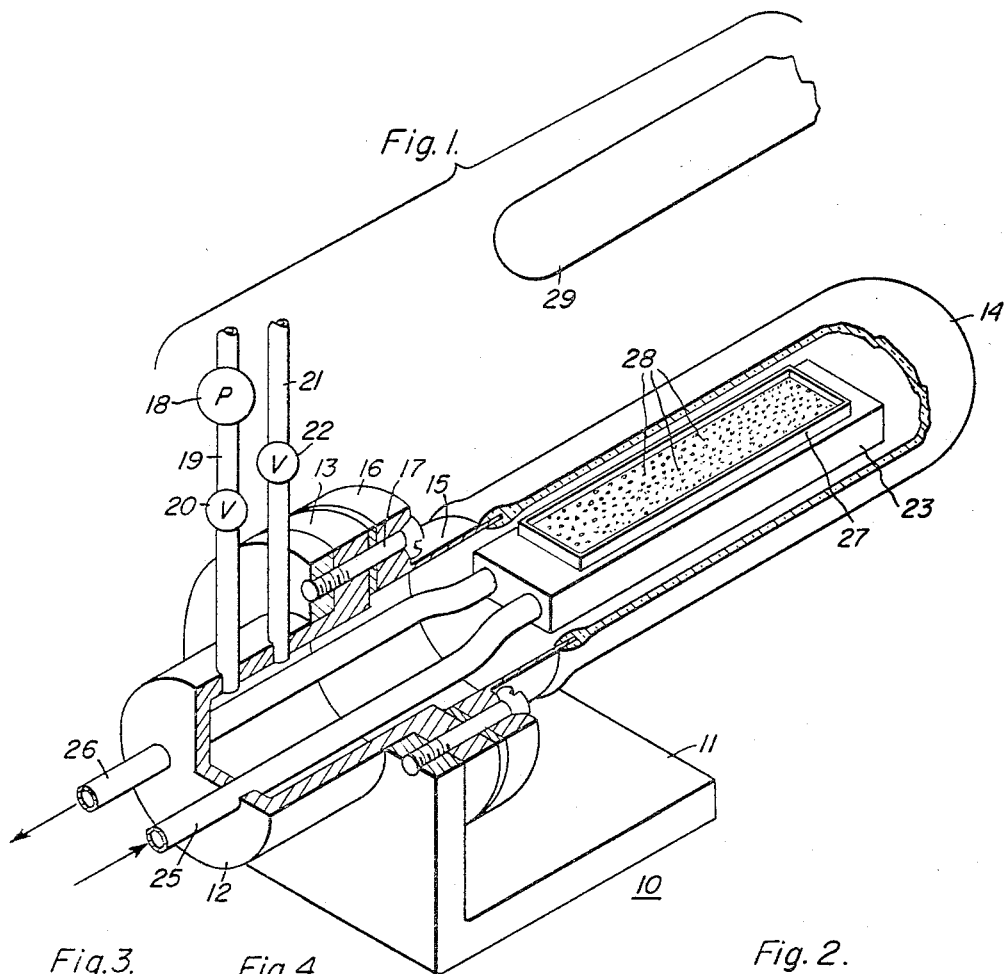
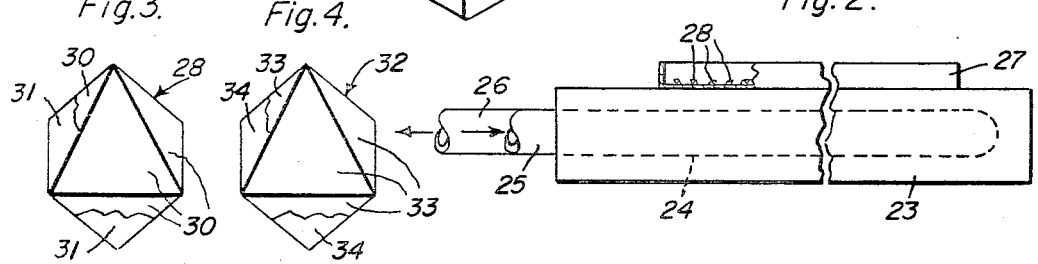
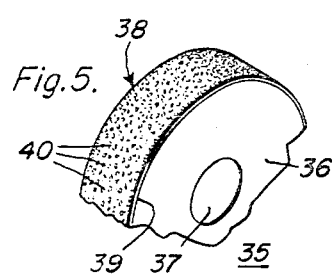
Inventors:
Archibald N. Wright;
Wilfred F. Mathewson, Jr.,
by Paul R. Webb, II
Their Attorney.

3,408,172
DIAMOND AND CUBIC BORON NITRIDE
GRAINS COATED WITH PHOTOPOLYM-
ERIZED MATERIAL
Archibald N. Wright, Schenectady, N.Y., and Wilfred F.
Mathewson, Jr., Franklin, Mich., assignors to General
Electric Company, a corporation of New York
Filed Mar. 1, 1966, Ser. No. 530,938
11 Claims. (Cl. 51—295)

ABSTRACT OF THE DISCLOSURE

Abrasive particles comprising diamonds or cubic boron nitride are provided with an adhesive film on at least a portion of their faces or surfaces via ultraviolet surface photopolymerization of a photopolymerizable gaseous material. These coated abrasive articles when combined with an organic binder to form a grinding wheel, give an improved abrasive grinding wheel.

---

This invention relates to abrasive particles and abrasive articles, and more particularly to abrasive particles which are provided with an adhesive film on at least a portion of their faces or surfaces and to abrasive articles incorporating such coated particles.

A conventional type of an abrasive article is a phenolic resin bonded grinding wheel. Such a wheel has a metal or resin wheel core with a rim on which is molded an abrasive layer which comprises a phenolic resin, silicon carbide and a plurality of natural or synthetically produced diamond particles or borazon particles imbedded in the resin. The term "borazon" covers cubic boron nitride disclosed and claimed in U.S. Patent 2,947,617, issued Aug. 2, 1960, and assigned to the same assignee as the present application. It is desirable to improve the strength of adhesion between the phenolic resin and the diamond or borazon particles imbedded therein in such an abrasive article. Such improved adhesion strength increases the grinding ratio, which is a measurement of grinding wheel performance. Grinding ratio is determined by the volume of a specific material ground, such as tungsten carbide, per volume of wheel wear. It is also advantageous to improve the grinding ratio of diamond and borazon abrasive wheels which employ an organic binder other than a phenolic resin. It is further desirable to provide adhesive abrasive particles of diamond and borazon which will adhere more firmly to a resinous matrix thereby improving the grinding ratio of the resultant abrasive article.

Our invention is directed to improved adhesive abrasive particles of diamonds and borazon, and to improved abrasive articles including such adhesive abrasive particles. The improved adhesive abrasive particles of our invention have an adherent ultraviolet surface photopolymerized film on at least a portion of the faces of each of the particles. This film is formed by ultraviolet surface photopolymerization of a photopolymerizable gaseous material such as a vinyl monomer or a diene monomer which can be selected from 1,3-butadiene, methyl methacrylate hexachlorobutadiene, or acrylonitrile in accordance with the method described and claimed in copending application of Archibald N. Wright, Ser. No. 530,971 filed concurrently herewith, which application is assigned to the same assignee as the present application. Such a photopolymerizable gaseous material is a gas in which the molecules upon surface ultraviolet irradiation produce an intermediate species capable of polymerization.

Hexachlorobutadiene is not subject to conventional forms of polymerization, such as bulk or emulsion polymerization. While acrylonitrile has been polymerized by conventional means, this material has not been polymerized by ultraviolet surface photopolymerization from a gaseous phase. Both 1,3-butadiene and methyl methacrylate have been polymerized by ultraviolet surface photopolymerization but neither of these materials have been formed into a film. None of the above group of materials has been found to be a unique, adhesive film on portions of the faces of diamond and borazon abrasive particles.

It is, therefore, an object of our invention to provide an improved adhesive abrasive particle selected from the group consisting of diamond and borazon which has an adherent film on at least a portion of the faces of the particle.

It is another object of our invention to provide such an improved adhesive abrasive particle in which its adherent film is formed by ultraviolet surface photopolymerizable gaseous material such as a vinyl monomer or a diene monomer.

It is another object of our invention to provide an improved adhesive abrasive particle in which its adherent film is formed by ultraviolet surface photopolymerization from a gaseous material selected from the group consisting of 1,3-butadiene, methyl methacrylate, hexachlorobutadiene, and acrylonitrile.

It is a further object of our invention to provide an improved abrasive article which includes an organic bonding material and a plurality of adhesive abrasive particles imbedded therein, each of which particles has an adherent ultraviolet surface photopolymerized film on at least a portion of its natural faces.

It is a still further object of our invention to provide an improved abrasive article in which the above adherent particle film is partially solvent swollen thereby further improving strength of adhesion between the binder and the particles.

In accordance with our invention in one form, an abrasive article can be formed which has a substrate, and an abrasive layer bonded to the substrate, the abrasive layer comprising an organic binder and a plurality of adhesive abrasive particles imbedded therein selected from the group consisting of diamond and borazon, the abrasive particles being coated with an adherent film on at least a portion of its faces formed by ultraviolet surface photopolymerization of a photopolymerizable gaseous material.

These and various other objects, features and advantages of the invention will be better understood from the following description taken in connection with the accompanying drawing in which:

FIGURE 1 is a perspective view partially in section of an apparatus for forming films on abrasive particles in accordance with our invention;

FIGURE 2 is an enlarged side elevational view partially in section of a portion of the apparatus shown in FIGURE 1;

FIGURE 3 is a perspective view of a diamond particle with a film adhering firmly to at least a portion of its faces;

FIGURE 4 is a perspective view of a borazon particle with a film adhering firmly to at least a portion of its faces; and FIGURE 5 is a perspective view of a portion of an abrasive grinding wheel made in accordance with our invention.

In FIGURE 1 of the drawing, apparatus is shown generally at 10 for forming films on the faces or surfaces of abrasive particles selected from the group consisting of diamond and borazon in accordance with our invention. A base or support surface (not shown) is provided on which is mounted an L-shaped bracket 11 to support enclosure or chamber 12 having a flange 13 at its open end. A quartz tube 14 is bonded adjacent at its open end by any suitable metal-ceramic seal to a metal cylinder 15 having a flange 16 at its opposite end. Flange 16 is readily threaded to and unthreaded from flange 13 of enclosure 12 by means of a plurality of threaded fastener 17. A vacuum pump 18 is connected by line 19 to enclosure 12 to evacuate enclosure 12 and associated quartz tube 14. A control valve 20 is provided in evacuation line 19. An inlet line 21 is connected at one end to enclosure 12 and at its other end to a source (not shown) of material to be supplied in a gaseous state to tube 14. A control valve 22 is provided in line 21 to control the supply of material to enclosure 12 and tube 14.

A support block 23 of material such as copper (as shown) is positioned within tube 14. Block 23 has a U-shaped metal tube 24 imbedded therein, two ends 25 and 26 of which extend through cylinder 15, flanges 16 and 13, enclose 12 and through the wall of enclosure 12. Tube 24 circulates a cooling medium such as ethanol to block 23 and positions the block. The ends 25 and 26 of tube 24 are connected to a heat exchanger or other cooling equipment. A metal tray 27 is shown positioned on support block 23. A plurality of diamond particles 28 are positioned in a generally monolayer arrangement within tray 27. An ultraviolet light 29, which is normally provided with a reflector (not shown), is shown outside and spaced about quartz tube 14 and supported in any suitable manner. Such a light source provides ultraviolet light in a region of about 2,000 angstroms to 3,500 angstroms, which is directed by the reflector (not shown) towards the upper surface of diamond particles 28. For example, a Hanovia 700 watt lamp with a reflector will provide this particular light region. A metal enclosure with a door, which is not shown, is positioned around the above apparatus during its operation.

In FIGURE 2 of the drawing, an enlarged side elevational view is shown of support block 23 which was described above in connection with FIGURE 1 of the drawing. Block 23 has a U-shaped tube 24 embedded therein, the two ends 25 and 26 of which circulate a cooling medium to and from block 23, respectively. Tray 27 is shown partially in section to disclose more clearly diamond particles 28 therein.

In FIGURE 3 of the drawing, there is shown a single diamond particle 28 which has a plurality of faces 30. A film 31 adheres firmly to at least a portion of the faces 30 of particle 28. Film 31 is formed on diamond particle 28 in the apparatus shown in FIGURE 1 of the drawing.

In FIGURE 4 of the drawing, there is shown a single borazon particle 32 which has a plurality of faces 33. A film 34 adheres firmly to at least a portion of faces 33 of particle 32. Film 34 is formed on borazon particles 32 in the apparatus shown in FIGURE 1 of the drawing.

In FIGURE 5 of the drawing, there is shown a perspective view of a portion of an abrasive grinding wheel 35 which has an aluminum wheel core 36 with an arbor hole 37 therethrough. An abrasive layer 38 is shown bonded to the rim of wheel 35. This layer 38 comprises an organic bonding material 39, such as a phenolic resin, with an addition of silicon carbide, and a plurality of adhesive coated abrasive diamond particles 40 therein.

We have found unexpectedly that an exceptionally strong bond could be formed between an abrasive diamond or borazon particle and an organic binder if the particle has an adherent film on at least a portion of its faces formed in the manner described above.

We have found further that a superior abrasive article could be formed in which the abrasive layer has an organic bonding material and a plurality of the above coated adhesive particles imbedded therein.

We have found also that the strength of adhesion of the above coated particles could be increased further by swelling the particle film with a compatible partial solvent. For example, compatible partial solvents for a phenolic binding resin include carbon tetrachloride for a film formed from hexachlorobutadiene, methyl ethylketone for a film formed from methyl methacrylate, and tetrahydrofuran for a film formed from acrylonitrile.

In an illustrative operation of the apparatus shown in FIGURE 1 of the drawing, a stainless steel tray with a monolayer of diamond particles 28 therein was positioned on copper support block 23. Quartz tube 14 was then attached by its flange 16 to flange 13 of enclosure 12 by means of threaded fastener 17. Vacuum pump 18 was started and pumped down the chamber defined by tube 14, cylinder 15, and enclosure 12 to a pressure of about 10 microns. Valve 20 was then closed. A material selected from the group consisting of 1,3-butadiene, methyl methacrylate, hexachlorobutadiene, and acrylonitrile was supplied from a liquid source (not shown) through line 21 in a gaseous state to enclosure 12 whereby it was fed into the interior of quartz tube 14. Each of the above materials is initially retained in its liquid state by maintaining its temperature below room temperature which is accomplished by employing a cooling bath surrounding the liquid materials. The liquid is also maintained at a vapor pressure in the range of 0.1 to 8 millimeters of mercury by the temperature of the cooling bath whereby its introduction from the source to the inlet line is in a gaseous state. Ultraviolet lamp 29 was positioned above quartz tube 14 and spaced approximately 2 inches from the upper surface of diamond particles 28. The lamp has an effective wave length in the range of 2,000 angstroms to 3,500 angstroms.

The monomer was introduced into quartz tube 14 and the pressure rose. A metal hood (not shown) was positioned around apparatus 10 since an ultraviolet light source is used. Lamp 29 is turned on. After a period of time, lamp 29 was shut off, monomer valve 22 was closed and the system was re-evacuated to about 10 microns. In order to provide a film on a number of the faces of each of the diamond particles, metal tray 27 was agitated by holding a magnet against the exterior surface of tube 14 and then tapping the magnet against the tube. The above procedure was repeated a second and a third time but the agitation was employed only after the second operation. Lamp 29 was then shut off, monomer valve 22 closed and the system pumped down to about 10 microns pressure to remove all by-products. The metal hood was removed and the vacuum was then broken. Tube 14 was cooled to room temperature and disconnected by unthreading fasteners 17 which held its associated flange 16 to flange 13. After tube 14 was removed, tray 27 was taken off copper block 23 and the diamond particles were examined. The particles had a green-gray color as opposed to the gray color of the initial uncoated diamonds. Upon further examination under a microscope these diamond particles 28 showed an adherent film 31 formed on at least a portion of the faces 30 of the diamond particles.

Such a diamond particle 28 with its film 31 thereon as described above is shown in FIGURE 3 of the drawing. A borazon particle 32 prepared in a similar fashion is shown in FIGURE 4. A film 34, which is described above, adheres firmly to faces 33 of this particle 32.

In FIGURE 5 of the drawing, there is shown a portion of an abrasive grinding wheel 35 made in accordance with our invention. Wheel 35 has an aluminum wheel core 36 with an arbor hole 37 therethrough. Abrasive layer 38 has an organic binder 39, such as a phenolic resin, with an addition of silicon carbide, and a plurality of adhesive abrasive diamond particles 40 therein. This wheel was made in a conventional manner by placing the core and abrasive mix in a compression mold, placing the loaded mold on a heated platen press, pressing at an elevated temperature, and post curing at an elevated temperature.

The above adhesive abrasive diamond particles 40 which are contained in abrasive layer 38 are of the type shown in FIGURE 3 of the drawing wherein each diamond particle 28 has the above described film 31 on at least a portion of its natural faces 30. Additionally, diamond particles 40 are treated further prior to incorporation into the above abrasive mix. These particles are placed in a solution which is a compatible partial solvent for film 31. The solvent swells the film thereby increasing the adhesion of the film to the organic binder. Subsequently, the wheel was tested on a Norton surface grinder under specified conditions to determine the grinding ratio of grinding wheel 35.

Examples of adhesive abrasive particles and abrasive articles which are in accordance with our invention are set forth below.

Example 1

Apparatus was set up in accordance with FIGURE 1 of the drawing. One gram of 80/100 mesh diamond particles was spread on an aluminum tray which was about six inches long and one inch wide. The tray was placed on the copper block. The quartz tube was positioned around the support block by threading this flange to the flange of the enclosure to which the gaseous material supply line and vacuum pump were connected. An ultraviolet light source, in the form of a Hanovia 700 watt lamp with a reflector, was positioned above the quartz tube and spaced about two inches from the upper surface of the diamond particles in the tray. The system was pumped down to a pressure of 10 microns of mercury and the control valve was closed. 1,3-butadiene was introduced in the gaseous state into the quartz tube. This monomer was maintained at its source (not shown) in liquid form by positioning in a cooling bath which was held at a temperature of $-78°$ C. thereby providing a vapor pressure of approximately four millimeters of mercury. Upon opening of the control valve in the supply line, the gaseous butadiene was supplied to the quartz tube. A metal hood was positioned around the apparatus. The lamp, which had an effective wave length in the range from 2,000 angstroms to 3,500 angstroms, was turned on. Gaseous butadiene was supplied to the quartz tube under the above light for a period of 24 hours. No cooling of the substrate was employed in this example. In this operation, a film was formed on at least a portion of the faces of the diamond particles by ultraviolet surface photopolymerization of gaseous 1,3-butadiene.

The process was concluded at the end of this time period by discontinuing the supply of gaseous butadiene, turning off the ultraviolet light source, removing the hood, opening the vacuum pump control valve, and pumping down the interior of enclosure 12 and tube 14 to a pressure of about four millimeters of mercury to remove gaseous material and any by-products therefrom. The vacuum was then broken and the quartz tube was removed by unthreading this flange from the enclosure flange. Visual examination disclosed an adherent film on at least a portion of the natural faces of the diamond particles which film was estimated to be approximately 2,000 angstroms in thickness.

Example 2

The same apparatus, method and gaseous material as were described above in Example 1 were employed in this example. However, borazon particles of 60/80 mesh were employed rather than diamond particles. The same vapor pressure of the monomer was employed but the process was continued for a period of 15 hours. As in Example 1, no cooling was employed. Visual examination of the product disclosed an adherent film on at least a portion of the natural faces of the borazon particles which film was estimated to be approximately 1,100 angstroms in thickness.

Example 3

The same apparatus, method and particles as described above in Example 1 were employed in this example. However, the gaseous material employed was that obtained from methyl methacrylate which was cooled at its source to a temperature of $-22°$ C. thereby providing a vapor pressure of four millimeters of mercury. The diamond particles were exposed to the gaseous monomer in the above ultraviolet light for a period of 15.25 hours. Visual examination of the particles subsequent to the conclusion of the process disclosed a similar film which had a thickness of approximately 1,000 angstroms.

Example 4

The same apparatus and method as described above in Example 1 were employed in this example, but borazon particles were used and the gaseous material was that obtained from methyl methacrylate. After 13 hours the process was discontinued and visual examination disclosed a similar film which had a thickness of about 1,200 angstroms.

Example 5

The same apparatus and method as described above in Example 1 were employed in this example, but the gaseous material employed was that obtained from hexachlorobutadiene. This monomer was cooled at its source to a temperature of $18°$ C. thereby providing a vapor pressure of 0.13 millimeter of mercury, Fifteen separate batches of diamonds, each batch consisting of three grams of 80/100 mesh diamond particles, had a film formed thereon in accordance with the above-described method. Twenty-four additional batches of diamonds, each batch consisting of 1.5 grams of 80/100 mesh diamond particles, had a similar film formed thereon.

In each of these 39 separate batches, the gaseous monomer was admitted to the quartz tube and ultraviolet light source was then turned on for a period of 12 minutes. The monomer was discontinued, the light was shut off, and the system was again pumped down to about 10 microns to remove by-products. The diamond particles were agitated in their tray by employing a magnet which drew the tray to the side of the quartz tube and by the tapping of the magnet against the tube. The process was repeated for a second and third 12-minute period. The diamond particles were agitated again after the second 12-minute period. Thus, 36 minutes of ultraviolet surface photopolymerization was used for each of these 39 separate batches. During each of the above process periods, the substrate temperature was cooled from a normal temperature of $177°$ C., caused by the heat from the light source, to a substrate temperature of about $102°$ C. resulting in a substantial rate increase in the film formation and a shortening of tthe time involved. After the process was concluded in each of the above batches, visual examination disclosed an adherent film on at least a portion of the faces of the particles. A total of 81 grams of diamond particles were coated in this example.

Example 6

The same apparatus and method as described above in Examples 1 and 5 were employed in this example, but the gaseous material was acrylonitrile. This monomer was cooled at its source to a constant temperature of $-34°$ C. $+2°$ C. by employing a bath consisting of ethylene glycol (49 volume-percent), and water (51 volume-percent), and liquid nitrogen. The vapor pressure was four millimeters of mercury. Three separate 12-minute periods of exposure to ultraviolet light after introduction of the gaseous monomer were employed as above in Example 5. After the first and second 12-minute periods, the diamond particles were agitated as described above in Example 5. Twenty-one separate batches of diamonds, each batch consisting of 1.5 grams of 80/100 mesh diamond particles, had a film formed thereon in accordance with our method. After the process was concluded in each of these batches, visual examination disclosed an adherent film on at least a portion of the faces of the particles. A total of 31.5 grams of diamond particles were coated in this example.

Example 7

The same apparatus and method as described above in Examples 1 and 5 were employed in this example. Diamond particles were used and the gaseous material was hexachlorobutadiene. Twenty-one separate batches, each containing 1.5 grams of 80/100 mesh diamond particles were coated in this example. Three separate 12-minute periods of exposure to ultraviolet light after introduction of the gaseous monomer were employed as above in Example 5. After the first and second 12-minute periods, the diamond particles were agitated as described above in Example 5. After the process was concluded in each of these batches, visual examination disclosed an adherent film on at least a portion of the faces of the particles.

Example 8

An abrasive article was made of the adhesive diamond particles from Example 1 and the adhesive borazon particles from Example 2. One of these abrasive articles container 25 volume percent of adhesive diamond particles, 37.5 volume percent phenolic molding resin, and 37.5 volume percent silicon carbide. The other abrasive article was the same except that it contained 25 volume percent of adhesive borazon particles rather than diamond particles. Silicon carbide was employed to increase the modulus of the elasticity and the ultimate strength of the resinous matrix. Both of these abrasive articles, one with adhesive diamond particles and the other with adhesive borazon particles, were hot pressed for 20 minutes at 178° C. and 2,000 p.s.i. to a final shape of 1 inch by ¼ inch by ⅜ inch and cured at about 88° C. for 12 hours. Each of these articles were then tested for transverse rupture strength. The transverse rupture strengths of both articles indicated a substantial improvement in the modulus of rupture over similar abrasive articles with uncoated diamond particles or uncoated borazon particles. Microscopic examination of both abrasive articles indicated that the polymeric film had not been stripped from the faces of the borazon or of the diamond particles.

Example 9

The adhesive borazon particles of Example 4 were each made into an abrasive article in the same manner as the abrasive articles described above in Example 8. Transverse rupture tests on the abrasive article with adhesive borazon particles indicated a strength of 12,000 p.s.i. This is double the transverse rupture strength of 6,000 p.s.i. measured for a similar article with uncoated borazon particles.

Example 10

Three abrasive grinding wheels with adhesive diamond particles as described above were made. One abrasive grinding wheel was made in which uncoated diamond particles were employed. The adhesive diamond particles had a film on at least a portion of their faces formed from gaseous hexachlorobutadiene as described above in Examples 5 and 7. Each of the four wheels was 5 inches in diameter by ³⁄₁₆ inch thick. The aluminum wheel core was 4¾ inches in diameter and had a 1¼ inch arbor hole. The abrasive rim, which was ⅛ inch by ³⁄₁₆ inch in cross section, contained 5.46 grams of 80/100 mesh diamond particles, 7.2 grams of FFF grade silicon carbide, and 3.08 grams of 5417 Bakelite phenolic resin. The wheel core and abrasive mix were placed in a compression mold. The loaded mold was placed on a heated platen press, pressed for 30 minutes at about 177° C. at 20,000 pounds of force to stops, then 4,000 pounds with stops removed. The wheels were then post cured for 17 hours with a maximum temperature at about 190° C. for 12 hours.

The adhesive diamond particles were also treated prior to incorporation into the above abrasive rim mixture by immersing them in a solution of carbon tetrachloride. The purpose of this step was to swell the film on the diamond particles by employing a compatible partial solvent for the film thereby increasing the strength of adhesion between the particles and the resin.

Thes above four wheels were tested on a Norton surface grinder under the same conditions to determine the respective grinding ratios, the general measurement of wheel performance. A table speed of 50 feet per minute, a cross feed of 0.050 inch, a downfeed of 0.001 inch per pass, a total downfeed of 0.025 inch, and a wheel speed of 4,900 feet per minute were employed. Wheel performance was judged in terms of grinding ratio, which is the volume of carbide ground (grade 370 tungsten carbide) per volume of wheel wear. The results were as follows: Wheel 1, with the uncoated diamond particles showed a grinding ratio of 109. The grinding ratios of wheels 2, 3 and 4, which incorporated adhesive diamond particles, were 122, 138 and 142, respectively. The difference in the coated diamonds were as follows: In wheel 2, the diamonds had been coated in five gram batches and were subsequently treated with 0.55 milliliter of carbon tetrachloride. Wheel 3 had diamond particles which had been coated in three gram batches and treated with 0.55 milliliter of carbon tetrachloride. The fourth wheel had diamond particles which had been coated in one-three gram batches and treated with 0.55 milliliter of carbon tetrachloride.

Example 11

A grinding wheel was made and tested in a manner similar to Example 10. The diamond particles which were employed in this wheel were coated initially with a film from gaseous acrylonitrile. The abrasive rim, which was ⅛ inch by ³⁄₁₆ inch in cross section, contained 5.46 grams of 80/100 mesh diamonds, 7.2 grams of FFF grade silicon carbide, and 3.08 grams of 5417 Bakelite phenolic resin. The wheel was then tested under the same conditions as above in Example 10 and resulted in a grinding ratio of 170.

Example 12

An abrasive grinding wheel is made with adhesive diamond particles as described above. Fifty parts of 80/100 mesh diamond particles are mixed with five parts of a xylol solution of a partially dehydrated methyl silicone resin containing 40% solids until the particles are thoroughly wet with the resin solution. Ten parts of a brittle, pulverulent, dehydrated methyl silicone resin are added and the mixture is tumbled in a mill to coat the wetted diamond particles with resin. The resin coated particles are then cold molded into a grinding wheel 1 inch thick and 10 inches in diameter under 10,000 p.s.i. pressure. The molded grinding wheel is placed in an oven and heated at a temperature gradually increasing from 100° C. to 250° C. for 40 hours, and the temperature is then maintained at 250° C. for 8 hours.

While other modifications of the invention and variations thereof which may be employed within the scope of the invention have not been described, the invention is intended to include such as may be embraced within the following claims.

What we claim as new and desire to secure by Letters Patent of the United States is:

1. An adhesive abrasive particle comprising a particle selected from the group consisting of diamond and borazon, and an adherent film having a thickness of at most 2000 A. on at least a portion of the faces of said particle, said film formed by ultraviolet surface photopolymerization of a photopolymerizable gaseous material selected from the group consisting of 1,3-butadiene, hexachlorobutadiene, acrylonitrile, and mixtures thereof.

2. An abrasive article comprising a substrate, and an abrasive layer bonded to said substrate, said abrasive layer comprising a synthetic resin binder and a plurality of adhesive abrasive particles imbedded therein selected from the group consisting of diamond and borazon, each of said particles being coated with an adherent, continuous film having a thickness of at most 2000 A. on at least a portion of its faces, said film formed by ultraviolet surface photopolymerization from a photopolymerizable gaseous material selected from the group consisting of 1,3-butadiene, hexachlorobutadiene, acrylonitrile, and mixtures thereof.

3. A method of forming an adherent film which comprises ultraviolet surface photopolymerizing a photopolymerizable gaseous material selected from the group consisting of 1,3-butadiene, hexachlorobutadiene, acrylonitrile, and mixtures thereof, on at least a portion of the faces of a particle selected from the group consisting of diamond and borazon, said film having a thickness of at most 2000 A.

4. In a process for producing an abrasive article comprising a plurality of abrasive particles bonded to a substrate with a synthetic resin binder, at least some of said particles selected from the class consisting of diamond and borazon, the improvement which comprises coating at least a portion of the face of the diamond or borazon particles with an adherent film by ultraviolet surface photopolymerization of a photopolymerizable gaseous material selected from the class consisting of 1,3-butadiene, hexachlorobutadiene, acrylonitrile, and mixtures thereof, prior to incorporating said particles in said organic binder, said film having a thickness of at most 2000 A.

5. A process as in claim 4 wherein the abrasive article is a grinding wheel.

6. An adhesive abrasive particle comprising a particle selected from the group consisting of diamond and borazon, and an adherent film formed by ultraviolet surface photopolymerization of the polymerization product of hexachlorobutadiene on at least a portion of the faces of said particle, said film having a thickness of at most 2000 A.

7. The particle of claim 1, in which the film is partially solvent swollen.

8. The article of claim 2, in which the substrate is a grinding wheel rim.

9. The article of claim 8, in which the synthetic resin bonding material is a phenol formaldehyde resin.

10. The article of claim 2, in which the synthetic resin bonding material is a phenol formaldehyde resin and contains silicon carbide grains.

11. The article of claim 10, in which the film is partially solvent swollen.

References Cited
UNITED STATES PATENTS

| | | | |
|---|---|---|---|
| 2,265,236 | 12/1941 | Kistler | 51—298 |
| 2,308,854 | 1/1943 | Barnes | 51—298 |
| 2,327,218 | 8/1943 | Robie | 51—298 |
| 2,666,025 | 1/1954 | Nozaki | 204—159.22 |
| 2,862,806 | 12/1958 | Nestor | 51—298 |
| 3,069,381 | 12/1962 | Nozaki | 204—159.22 |

DONALD J. ARNOLD, *Primary Examiner.*